(12) United States Patent
Ishimoto

(10) Patent No.: US 6,593,991 B2
(45) Date of Patent: Jul. 15, 2003

(54) LIQUID CRYSTAL DISPLAY APPARATUS WITH TWO-TERMINAL NONLINEAR DEVICES

(75) Inventor: Yoshihisa Ishimoto, Tondabayashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 09/726,494

(22) Filed: Dec. 1, 2000

(65) Prior Publication Data

US 2001/0002856 A1 Jun. 7, 2001

(30) Foreign Application Priority Data

Dec. 1, 1999 (JP) .......................................... 11-341863
Oct. 20, 2000 (JP) ....................................... 2000-321253

(51) Int. Cl.[7] .......................................... G02F 1/1343
(52) U.S. Cl. ........................ 349/139; 349/49; 349/51; 257/30
(58) Field of Search ........................... 349/139, 48, 49, 349/51; 257/30

(56) References Cited

U.S. PATENT DOCUMENTS 4,523,811 A * 6/1985 Ota .............................. 349/51
6,222,596 B1 * 4/2001 Veerasamy ................... 349/50

FOREIGN PATENT DOCUMENTS

| JP | 5983190 | 5/1984 |
|---|---|---|
| JP | 32673 | 8/1986 |
| JP | 954344 | 2/1997 |

* cited by examiner

Primary Examiner—Robert H. Kim
Assistant Examiner—P. R. Akkapeddi
(74) Attorney, Agent, or Firm—Birch, Stewart, Kolasch & Birch, LLP.

(57) ABSTRACT

A liquid crystal display apparatus is provided which is capable of realizing a uniform display even at a high definition and offering a widened operating temperature. A signal line is formed on a signal line through an intervening insulating layer in an active-matrix type liquid crystal display apparatus of MIM drive type. MIM devices as two-terminal nonlinear devices are formed between each pixel electrode and the signal lines. The MIM devices are formed to operate in different operating temperature ranges. By selecting one of the signal lines to be supplied with a driving signal to achieve switching between the MIM devices, the pixel electrode associated therewith can operate within a wider operating temperature range. The respective resistances of the signal lines and/or MIM devices associated with each pixel electrode are adjusted so as to be equalized throughout all the pixel electrodes, thereby lessening a non-uniform display to ensure a uniform display.

3 Claims, 8 Drawing Sheets

LIQUID CRYSTAL DISPLAY APPARATUS WITH TWO-TERMINAL NONLINEAR DEVICES

BACKGROUND OF THE INVENTION

1. Field of the Invention

The present invention relates to an active matrix type liquid crystal display apparatus comprising a two-terminal nonlinear device such as an MIM (Metal Insulator Metal) device.

2. Description of the Related Art

In recent years, liquid crystal display apparatuses have widely been used for displaying purposes in personal computers, word processors, terminal displays of office-automation equipment, television image display apparatuses and like applications by virtue of their advantageous characteristics such as low power consumption, thinness and lightness. Liquid crystal display apparatuses are expected to find wider use, particularly, as image displays of portable information terminal devices. An electronic book, which serves as a substitute of a conventional book formed by binding printed paper sheets, is one such information terminal device. According to the aimed specifications of a liquid crystal display apparatus for use in this device, the screen size is about 6 to about 7 inches, the definition is about 1024×768 dot XGA, and the operating temperature range is about −20 to 70° C. An active matrix type liquid crystal display apparatus using an MIM drive has been disclosed in, for example, Japanese Unexamined Patent Publications JP-A 59-83190 (1984) and JP-A 9-54344 (1997).

FIGS. 9 and 10 illustrate part of the configuration of a conventional MIM-drive active matrix type liquid crystal display apparatus. FIG. 9 is a plan view of a partial configuration associated with one pixel, and FIG. 10 is a sectional view taken on line X—X in FIG. 9. On an electrically insulating glass substrate 1 is formed a thin tantalum (Ta) film having a thickness of 3000 Å which will form a signal line 2 and a lower electrode 3 by sputtering or a like process. The thin tantalum film is patterned into a desired configuration to form the signal line 2 and the lower electrode 3 by photolithography. Subsequently, the surface of the lower electrode 3 is subjected to anodizing to form a 600 Å-thick insulating film 4 comprising tantalum pentoxide ($Ta_2O_5$). On the entire surface of the substrate in this state is stacked a titanium (Ti) film, which will form an upper electrode 5, to a thickness of 4000 Å by sputtering or a like process, followed by patterning into a desired configuration by photolithography to form the upper electrode 5. In this way, there is formed a single MIM device 6 comprising the lower electrode 3, insulating film 4 and upper electrode 5.

Further, in the case where the liquid crystal display apparatus to be constructed is of the transmissive type, a transparent electrode film of ITO (Indium Tin Oxide) or a like material is stacked on the resulting structure and then patterned into a pixel electrode 7. Alternatively, in the case where the apparatus is of the reflective type, a reflective electrode film comprising aluminum (Al) or a like material instead of ITO or the like is stacked on the resulting structure and then patterned into a reflective pixel electrode, or, alternatively, a transparent electrode 7 of ITO or a like material is formed on the resulting structure, followed by affixing a reflective plate to the whole reverse side of the glass substrate 1. A plurality of such pixel electrodes are arrayed in a matrix shape, and signal lines 2 are routed to associated parts so that each pixel electrode 7 should be selectively driven through the associated MIM device 6. Similarly, pixel electrodes are formed on a counterpart glass substrate. The pair of substrates are mated with each other with their respective surfaces formed with respective pixel electrodes facing each other, and then a liquid crystal layer is placed between the pair of substrates to form the liquid crystal display apparatus.

FIGS. 11A and 11B illustrate an equivalent electric circuit configuration per pixel of an active matrix type liquid crystal display apparatus using an MIM drive and the voltage-current characteristic of an MIM device, respectively. In the equivalent circuit per pixel as shown in FIG. 11A, a parallel circuit including a resistor RMIM comprising the MIM device and a capacitor CMIM is serially connected to a parallel circuit including a resistor RLC comprising the liquid crystal layer and a capacitor CLC. When the liquid crystal layer is applied with a driving voltage V through the MIM device 6, a voltage VLC and a voltage VMIM are applied to the liquid crystal layer and the MIM device, respectively. The MIM device has the voltage-current characteristic as shown in FIG. 11B. As shown, the MIM device 6 exhibits a very large resistance and hence hardly allows a current to pass therethrough until the voltage VMIM at opposite ends of the MIM device 6 reaches a threshold voltage VTH. When the absolute value of the applied voltage VMIM exceeds the threshold voltage VTH, the MIM device 6 exhibits a decreasing resistance, while the voltage VLC applied to the liquid crystal layer increases to give rise to an electric field that changes the alignment of liquid crystals in the liquid crystal layer.

As described above, a liquid crystal display apparatus for use in an electronic book has a panel screen size of 5 to 7 inches and a definition as high as XGA, and operates within an operating temperature range of −20 to 70° C. according to the specifications thereof. In implementing a liquid crystal display apparatus with a screen having such a size and such an XGA-grade definition, the wiring resistance of the routed electrodes and the charge addressing time raise a problem. With increasing wiring resistance, a signal applied is rounded to a greater extent and, hence, a higher driving voltage becomes required. As the location of an MIM device associated with each pixel becomes remoter from a terminal for driving the active matrix type display apparatus, the resistance of the wiring from such a terminal to the MIM device increases. Therefore, the lighting characteristic of the panel used as a liquid crystal display apparatus varies at different points of the panel which correspond to points at which differences in resistance arise. This results in a non-uniform display and like inconveniences. In the liquid crystal display apparatus described in Japanese Unexamined Patent Publication JP-A 59-83190 (1984), a pair of signal lines extending in opposite directions from a pair of terminal electrodes, respectively, are placed opposite to each other, and an MIM device is disposed between and connected to each of the signal lines and each pixel electrode. This arrangement described in this Gazette, however, aims to correct a pixel defect and, therefore, a driving signal is delivered to the pixel electrode from only one of the pair of signal lines via the associated MIM device in a normal state and, in case of the presence of a defective MIM device connected to the usually used signal line, the other signal line is used to deliver such a driving signal to the pixel electrode. This means that the Gazette does not disclose any arrangement to deliver driving signals to a pixel electrode from both of the pair of signal lines and, accordingly, a non-uniform display and like inconveniences cannot be prevented.

As a duty ratio increases with a higher definition, the charge addressing time per pixel is shortened. This results in degraded ON characteristic of MIM device 6 in particular. An active-matrix type panel in which one pixel electrode is provided with one MIM device 6 is usable within the operating temperature range of from about 0 to about 60° C., or from about −20 to about 40° C., and cannot be used within a wider temperature range above 60° C. Japanese Unexamined Patent Publication JP-A 9-54344 (1997) discloses a liquid crystal display apparatus in which two MIM devices having different I–V characteristics are connected to one pixel electrode. This apparatus described in this Gazette, however, is configured to separately apply an on voltage and an off voltage for turning the liquid crystal on and off to a pixel electrode through respective MIM devices. This means that this Gazette does not teach any art of using the two MIM devices separately within different temperature ranges and, accordingly, the apparatus cannot be used within a wider temperature range.

SUMMARY OF THE INVENTION

Accordingly, an object of the invention is to provide a liquid crystal display apparatus which is capable of realizing a uniform display even with a high definition panel and which can be used within a wider temperature range.

The invention provides a liquid crystal display apparatus comprising a pair of substrates, a liquid crystal layer sandwiched between the pair of substrates, pixel electrodes arranged in a matrix shape on the substrates, and a plurality of two-terminal nonlinear devices provided for each of the pixel electrodes for selectively driving the pixel electrode, the two-terminal nonlinear devices being capable of separately driving the pixel electrode in different operating temperature ranges.

According to the invention, the two-terminal nonlinear devices selectively drive the pixel electrodes to realize a display of the liquid crystal display apparatus. The liquid crystal display apparatus has the plurality of two-terminal nonlinear devices for each of the pixel electrodes. Since the two-terminal nonlinear devices are different from each other in characteristics and are capable of separately driving according to different operating temperature ranges, a combination of these two-terminal nonlinear devices allows the liquid crystal display apparatus to be used within a wider temperature range.

In the invention it is preferable that the plurality of two-terminal nonlinear devices include a first two-terminal nonlinear device which allows a current equal to or higher than a first predetermined value to pass therethrough at a predetermined voltage, and a second two-terminal nonlinear device which allows a current equal to or lower than a second reference value which is smaller than the first reference value to pass therethrough at the predetermined voltage.

According to the invention, the plurality of two-terminal nonlinear devices provided for each of the pixel electrode include the first and second two-terminal nonlinear devices. The first two-terminal nonlinear device is formed to allow a current equal to or higher than the first reference value to pass therethrough at the predetermined voltage, while the second two-terminal nonlinear device is formed to allow a current equal to or lower than the second reference value which is smaller than the first reference value to pass therethrough at the predetermined voltage. By using the second two-terminal nonlinear device within a relatively high temperature range and the first two-terminal nonlinear device within a relatively low temperature range, the liquid crystal display apparatus, as a whole, can be used within a wider temperature range.

The invention also provides a liquid crystal display apparatus comprising a pair of substrates, a liquid crystal layer sandwiched between the pair of substrates, pixel electrodes arranged in a matrix shape on the substrates, two-terminal nonlinear devices for selectively driving each of the pixel electrodes, a signal line for delivering a driving signal to each of the pixel electrodes, and a terminal electrode provided at an end of the signal line, wherein the two-terminal nonlinear devices associated with each of the pixel electrodes have a resistance adjusted according to resistances of the signal line extending between the terminal electrode and the respective pixel electrode.

According to the invention, the resistance of the two-terminal nonlinear devices for each of the electrodes for selectively driving the pixel electrode is adjusted so that the difference between voltage drops at the respective pixel electrodes which occur at an application of a voltage should be made smaller, whereby influences due to the differences in resistance reflecting different signal line lengths can be absorbed, thus ensuring a display with less non-uniformity.

The invention yet also provides a liquid crystal display apparatus comprising a pair of substrates, a liquid crystal layer sandwiched between the pair of substrates, pixel electrodes arranged in a matrix shape on the substrates, first and second two-terminal nonlinear devices provided for each of the pixel electrodes for selectively driving the pixel electrodes, a first signal line for delivering a driving signal to each of the pixel electrodes via the first two-terminal nonlinear device, a second signal line for delivering a driving signal to each of the pixel electrodes via the second two-terminal nonlinear device, a first terminal electrode provided at an end of the first signal line, and a second terminal electrode provided at an end of the second signal line, wherein the first signal line and the second signal line are formed so that a total value of resistance of the first signal line extending from the first terminal electrode to the first two-terminal nonlinear device and resistance of the second signal line extending from the second terminal electrode to the second two-terminal nonlinear device is almost the same at the respective pixel electrodes, and each of the pixel electrode receives the driving signal from both the first and second signal lines.

According to the invention, the first signal line and the second signal line are formed so that a total value of resistance of the first signal line extending from the first terminal electrode to the first two-terminal nonlinear device and resistance of the second signal line extending from the second terminal electrode to the second two-terminal nonlinear device is almost the same at the respective pixel electrodes, and each of the pixel electrode receives the driving signal from both the first and second signal lines. This means that the total length of the first signal line and the second signal line from respective terminal electrodes to the associated pixel electrode is generally equalized throughout all the pixel electrodes to equalize influences due to voltage drops of driving signals delivered to the first and second signal lines throughout all the pixel electrodes, thereby realizing a display with less non-uniformity.

The invention further provides a liquid crystal display apparatus comprising a pair of substrates, a liquid crystal layer sandwiched between the pair of substrates, pixel electrodes arranged in a matrix shape on the substrates, two-terminal nonlinear devices for selectively driving the pixel electrodes, a terminal electrode to which a driving signal is delivered, a first signal line extending toward one side from the terminal electrode, an insulating film formed on the first signal line, and a second signal line formed on the insulating film, wherein the first and second signal lines are connected to each other at plural conductive portions, and the plural conductive portions each have a resistance adjusted according to resistances of the first and second signal lines between the terminal electrode and the respective pixel electrodes.

According to the invention, the second signal line formed on the insulating film, which in turn is formed on the first signal line, is connected to the first signal line at plural points, and the resistance between the terminal electrode and the two-terminal nonlinear device associated with each pixel electrode can be adjusted so as to be equalized throughout all the pixels. This arrangement is capable of lessening the difference in waveform between signals applied to respective pixel electrodes thereby realizing a display with less non-uniformity.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1A:
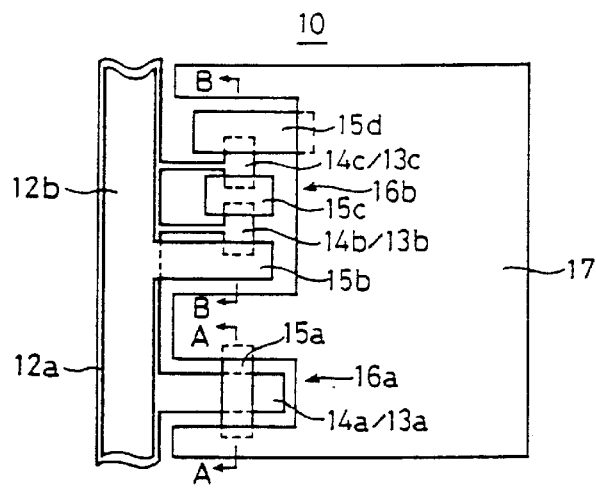
FIGS. 1A to 1F are plan and sectional views showing part of the configuration of an active-matrix type liquid crystal display apparatus 10 of a first embodiment of the invention.

Now referring to the drawings, preferred embodiments of the invention are described below.

Figure 1B:
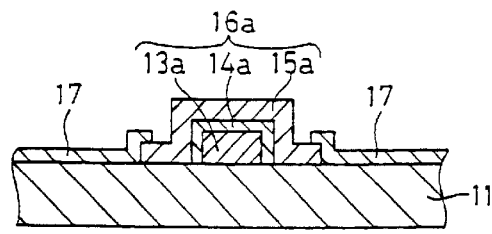
Figure 1C:
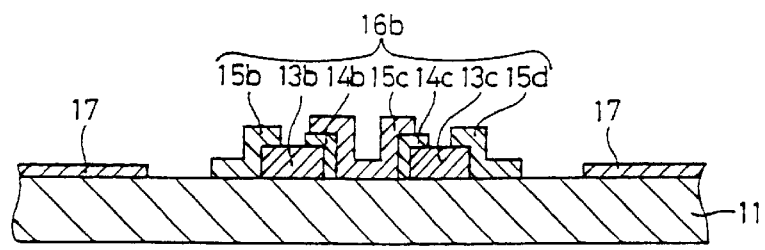
Figure 1D:
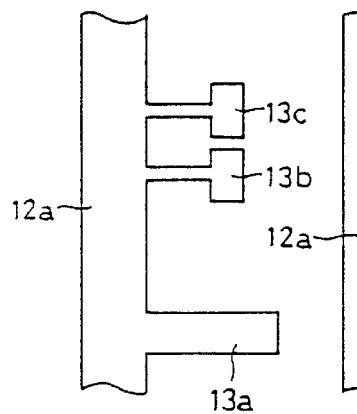
Figure 1E:
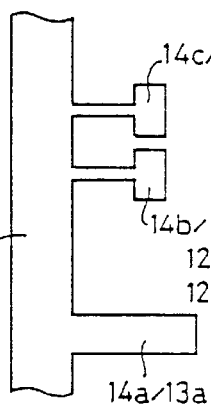
Figure 1F:
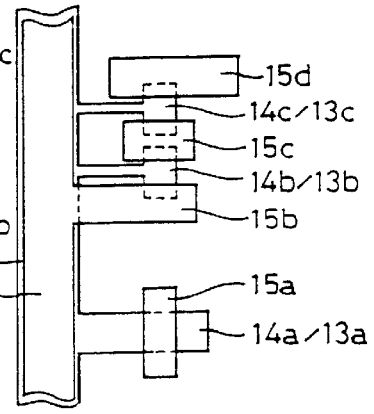

FIGS. 1A to 1F are partial plan and sectional views of the active-matrix configuration of a liquid crystal display apparatus 10 as a first embodiment of the invention. FIG. 1A is a partial plan view of the active-matrix configuration corresponding to one pixel, and FIGS. 1B and 1C are sectional views taken on line A—A and line B—B, respectively, in FIG. 1A. FIG. 1D shows a substrate having a signal line 12a and lower electrodes 13a, 13b and 13c formed thereon. FIG. 1E shows the substrate having insulating films 14a, 14b and 14c formed on the surface of the substrate as shown in FIG. 1D. FIG. 1F shows the substrate having upper electrodes 15a, 15b, 15c and 15d formed on the surface of the substrate as shown in FIG. 1E. On glass substrate 11 are formed signal line 12a and lower electrodes 13a, 13b and 13c (FIG. 1D). The signal line 12a and lower electrodes 13a, 13b and 13c are formed by patterning a thin tantalum film formed to 3000 Å thickness on the glass substrate 11 into a desired configuration by photolithography.

On the surfaces of the signal line 12a and lower electrodes 13a, 13b and 13c is formed an insulating film of tantalum pentoxide having a thickness of 600 Å by an anodizing process, and then the insulating film is patterned by photolithography to form the insulating films 14a, 14b and 14c (FIG. 1E) on the lower electrodes 13a, 13b and 13c (FIG. 1E), respectively. On the entire surface of the substrate is stacked a titanium layer having a thickness of 4000 Å by sputtering or a like process, and then the titanium layer is patterned into a desired configuration by photolithography to form the upper electrodes 15a, 15b, 15c and 15d (FIG. 1F) and the signal line 12b. In this way, MIM devices 16a and 16b are formed. Further, a transparent electrode film of ITO or a like material is stacked by sputtering or a like process, followed by patterning to form pixel electrodes 17.

Figure 2:
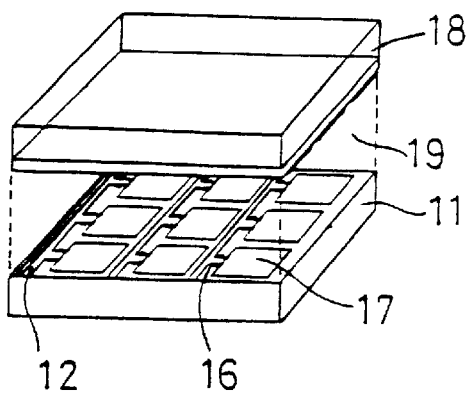
FIG. 2 is a schematic perspective view illustrating the overall structure of the liquid crystal display apparatus 10 having the active matrix configuration of FIGS. 1A to 1F.

FIG. 2 is a perspective view illustrating the overall structure of the liquid crystal display apparatus 10 as shown in FIGS. 1A to 1F. A counterpart substrate 18 is placed to face the side of the substrate 11 formed with the MIM devices 16a, 16b and pixel electrodes 17, and a liquid crystal layer 19 is confined in the space defined between the two substrates 11 and 18, thus forming the liquid crystal display apparatus 10. The liquid crystal layer 19 comprises a TN (Twisted Nematic) liquid crystal, for example. The side of the counterpart substrate 18 facing the glass substrate 11 is also formed with electrodes, and by varying the strength of an electric field produced between these electrodes and the pixel electrodes 17, the polarity of the TN liquid crystal is changed to achieve an image display.

Figure 3A:
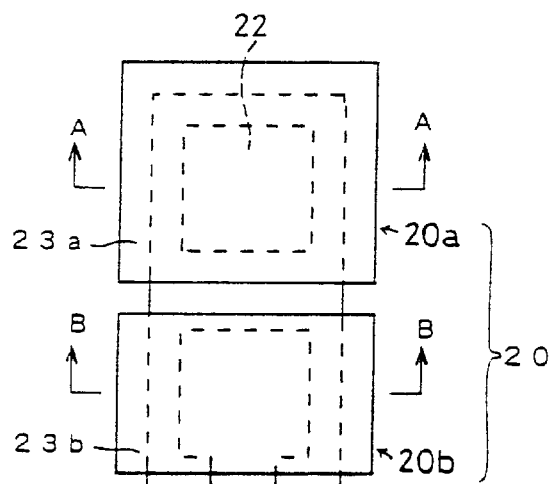
FIGS. 3A to 3C are plan and sectional views showing part of the structure of a terminal electrode 20 in the active-matrix configuration of FIGS. 1A to 1F.
Figure 3B:
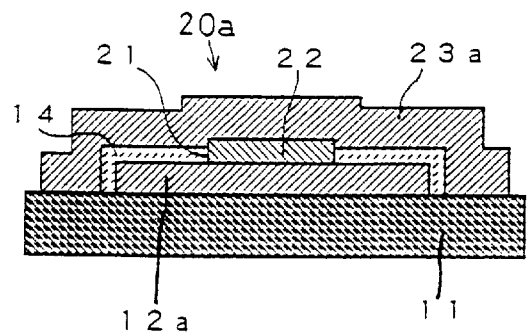
Figure 3C:
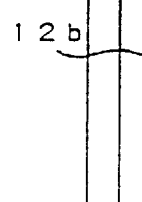

FIGS. 3A to 3C are plan and sectional views showing part of the structure of a terminal electrode in the active-matrix configuration of FIGS. 1A to 1F. FIG. 3A is a plan view of the terminal electrode 20 formed at an end of the signal lines 12a and 12b as shown in FIG. 1, and FIGS. 3B and 3C are sectional views taken on lines A—A and B—B, respectively, in FIG. 3A. As described above, the insulating film 14 is formed on the signal line 12a on the glass substrate 11. In this case, a through-hole 21 is defined by the insulating film 14 at a location adjacent the extremity of the signal electrodes. Subsequently, the signal line 12b and a conductive portion 22 are formed when the titanium layer for forming the upper electrodes 15a, 15b, 15c and 15d as shown in FIG. 1F is stacked. The conductive portion 22 is formed in the through-hole 21 defined at an end portion of the insulating film 14 and maintains an electric contact with the signal line 12a. Further, the transparent electrode film of ITO or a like material is formed by sputtering and then patterned to form the pixel electrodes 17 as well as connector terminal portions 23a and 23b. The connector terminal portion 23a is electrically connected to the lower signal line 12a via the conductive portion 22, while the connector terminal portion 23b is connected to the upper signal line 12b.

The MIM devices 16a and 16b as shown in FIG. 1 can be separately driven through the connector terminals 23a and 23b, respectively. When the MIM device 16a in a conducting state has a lower resistance than the other MIM device 16b in a conducting state, the MIM device 16b is used within a higher temperature range, while the MIM device 16a having a lower resistance is used within a lower temperature range. Such a separate use of these MIM devices 16a and 16b can provide for a display panel or a like device which can be used within a wider temperature range. More specifically, when the temperature is low, the pixel electrode 17 is driven by the use of the MIM device 16a through the following path: connector terminal 23a→through-hole 21 (conductive portion 22)→signal line 12a →lower electrode 13a→insulating film 14a→upper electrode 15a→pixel electrode 17. When the temperature is high, the pixel electrode 17 is driven by the use of the MIM device 16b through the following path: connector terminal 23b→signal line 12b→upper electrode 15b→lower electrode 13b→insulating film 14b→upper electrode 15c→insulating film 14c→lower electrode 13c→upper electrode 15d→pixel electrode 17.

Figure 4:
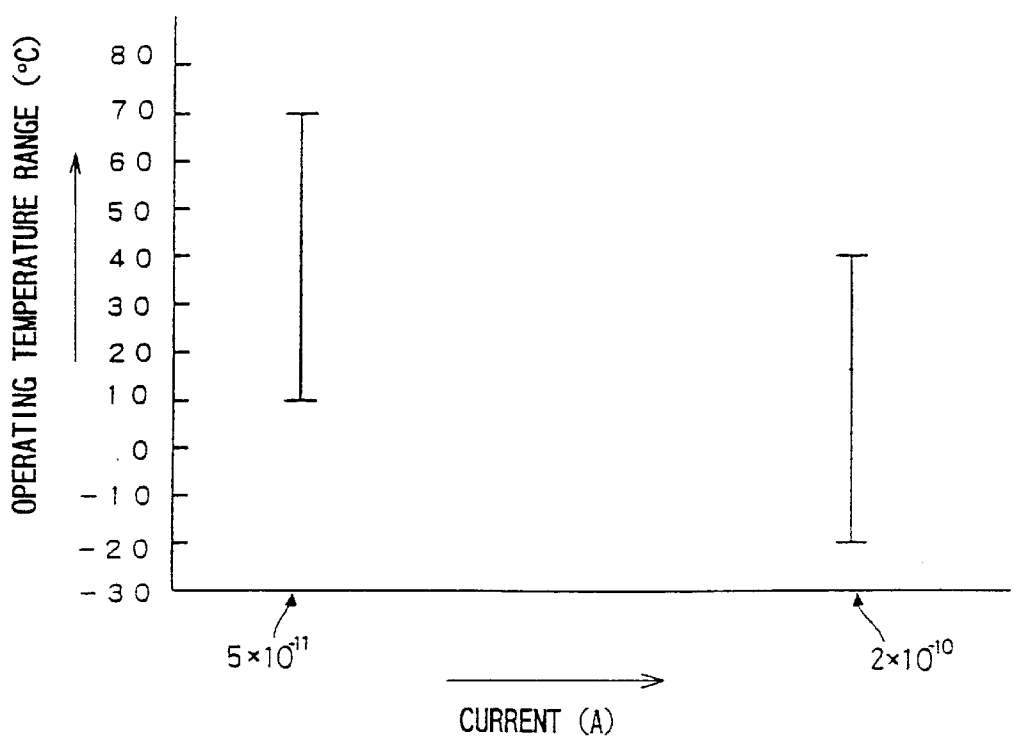
FIG. 4 is a graph representing the concept of a second embodiment of the invention in which MIM devices 16a and 16b used in the first embodiment of FIGS. 1A to 1C are separately used in different temperature ranges.

FIG. 4 is a graph representing the concept of a second embodiment of the invention in which the MIM devices 16a and 16b used in the first embodiment as shown in FIG. 1 are separately used in different temperature ranges, respectively, to broaden the operating temperature range. A current of $2\times10^{-10}$ A passes through the MIM device 16a having an area of 9 $\mu m^2$ at a voltage of 5 V, and the MIM device 16a can be used within the temperature range of from −20 to 40° C. Assume a current of $5\times10^{-11}$ A passes through the MIM device 16b having an area of 2.25 $\mu m^2$ at a voltage of 5 V, the MIM device 16b can be used within the temperature range of from 10 to 70° C. By driving the MIM device 16a as the first two-terminal nonlinear device within the temperature range of from −20 to 30° C. and driving the MIM device 16b as the second two-terminal nonlinear device within the temperature range of from 30 to 70° C., the liquid crystal display apparatus can present a satisfactory display within a wider temperature range of from −20 to 70° C. The concept of widening the operating temperature range can be applied to an arrangement using three or more two-terminal nonlinear devices for each pixel, or combined with each of the embodiments to be described later.

Figure 5A:
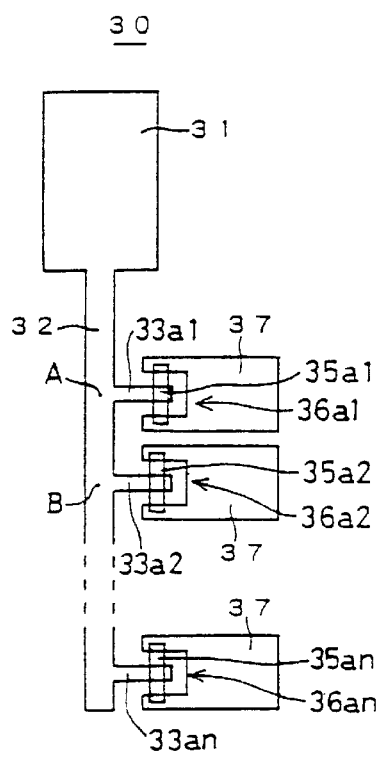
FIGS. 5A to 5C are partial plan views showing an active-matrix configuration of a liquid crystal display apparatus 30 as a third embodiment of the invention.
Figure 5B:
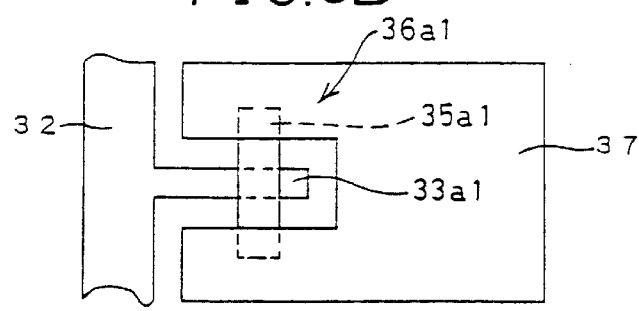
Figure 5C:
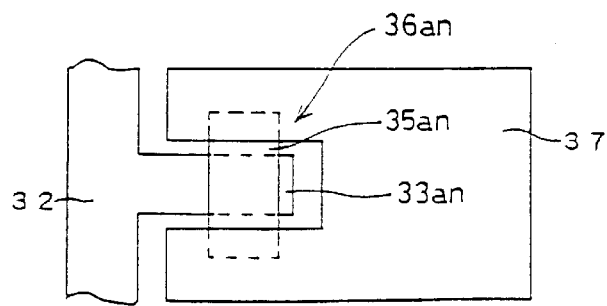

FIGS. 5A to 5C are partial plan views showing an active-matrix configuration of a liquid crystal display apparatus 30 as a third embodiment of the invention. FIG. 5A is a plan view showing a signal line 32 extending from one terminal electrode 31 and parts associated therewith. FIGS. 5B and 5C are enlarged views showing a farthest part and a nearest part from the terminal electrode 31 along the signal line 32. As in the first embodiment as shown in FIGS. 1A to 1F, the signal line 32 is formed at the same time with lower electrodes 33a1, 33a2, . . . , 33an from a thin tantalum film. On the lower electrodes 33a1, 33a2, . . . , 33an are stacked upper electrodes 35a1, 35a2, . . . , 35an via respective intervening insulating films to form MIM devices 36a1, 36a2, . . . , 36an. As shown in FIG. 5B, the lower electrode 33a1 extending from the signal line 32 to the MIM device 36a1 located nearest the terminal electrode 31 as well as the upper electrode 35a1 is relatively narrow in width, while on the other hand the lower electrode 33an as well as the upper electrode 35an associated with the MIM device 36an located farthest from the terminal electrode 31 are relatively wide in width.

Though the lower electrodes 33a1, 33a2, . . . , 33an and the upper electrodes 35a1, 35a2, . . . , 35an are formed in the same manner as in the embodiment as shown in FIG. 1, the MIM device 36a1 adjacent the terminal electrode 31 has a smaller area and hence has a higher resistance. The MIM device 36an farthest from the terminal electrode 31 has a larger area and hence has a lower resistance. By thus compensating for differences between the distances from the terminal electrode 31 to the pixel electrodes with differences in resistance between the MIM devices 36a1, 36a2, . . . , 36an, as a whole of the signal line 32, the total of the resistance of the signal line 32 extending from the terminal electrode 31 to each of the pixel electrodes 37 and the resistance of the MIM device 36a1, 36a2, . . . , 36an is equalized throughout all the pixels. This arrangement allows driving signals of generally the same waveform to be delivered to all the pixel electrodes 37, thereby eliminating a non-uniform display. Assuming the resistance of the signal line 32 to the MIM device 36a1 having resistance $R_{36a1}$ at the driving voltage is zero, the MIM device 36a2 has resistance $R_{36a2}$ lower than the resistance $R_{36a1}$ by wiring resistance r of the signal line 32 between positions A and B at the driving voltage. That is, the total of the resistance of the MIM device 36a2 and the wiring resistance at the driving voltage is $R_{36a1}$. The MIM devices 36 are equidistantly spaced from each other in the direction in which the signal line 32 extends from the terminal electrode 31, and accordingly the signal line 32 has resistance r between each pair of adjacent MIM devices. With the resistances of MIM devices being thus set sequentially, the total of the resistance of the signal line 32 to the $n^{th}$ pixel electrode and the resistance of the $n^{th}$ MIM device $R_{36an}$ satisfies the following equation:

$$R_{36an} + (n-1)r = R_{36a1}$$

Figure 6:
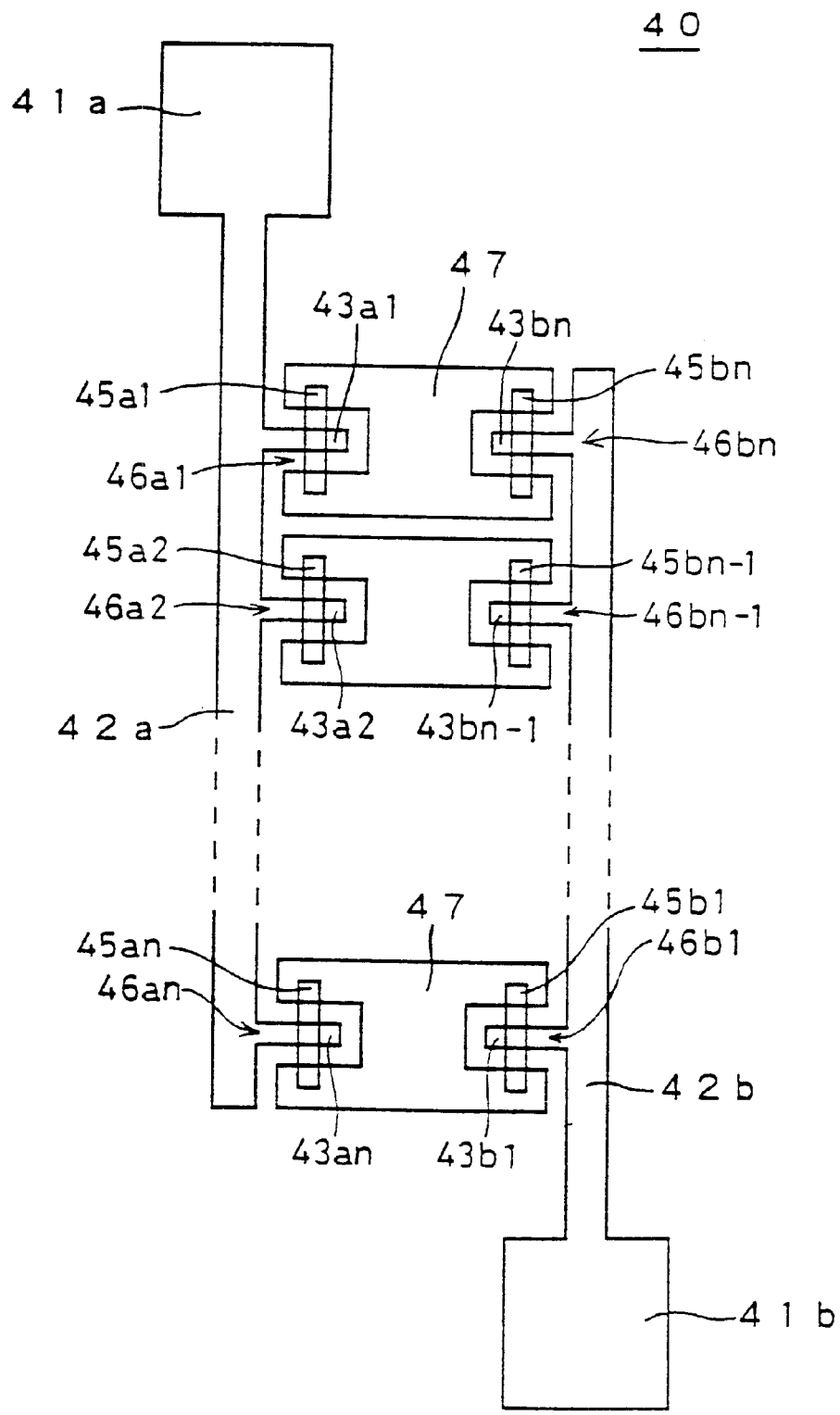
FIG. 6 is a partial plan view of an active-matrix configuration of a liquid crystal display apparatus 40 as a fourth embodiment of the invention.

FIG. 6 is a partial plan view of an active-matrix configuration of a liquid crystal display apparatus 40 as a fourth embodiment of the invention. In this embodiment, a configuration is employed such that signal lines 42a and 42b extending in opposite directions from a pair of terminal electrodes 41a and 41b are formed to face each other, instead of the configuration of the embodiment as shown in FIG. 5 wherein the plurality of pixel electrodes 37 are arranged along one signal line 32 extending from a single terminal electrode 31, and the respective resistances of MIM devices 36a1, 36a2, . . . , 36an are adjusted according to distances from the terminal electrode 31 to equalize the wiring resistances between the terminal electrode 31 to respective pixel electrodes 37.

The signal lines 42a and 42b extend parallel with each other, and lower electrodes 43a1 to 43an associated with the signal line 42a and lower electrodes 43b1 to 43bn associated with the signal line 42b extend toward each other. On the lower electrodes 43a1 to 43an and 43b1 to 43bn are formed respective insulating films, and further, upper electrodes 45a1 to 45an and 45b1 to 45bn are formed on the insulating films, respectively, to form MIM devices 46a1 to 46an and 46b1 to 46bn. The MIM devices 46a1 to 46an on one side intervene between the signal line 42a and pixel electrodes 47, while the MIM devices 46b1 to 46bn on the other side intervene between the signal line 42b and the pixel electrodes 47. These terminal electrodes 41a and 41b, signal lines 42a and 42b, lower electrodes 43a1 to 43an and 43b1 to 43bn, insulating films, upper electrodes 45a and 45b, and pixel electrodes 47 are formed in the same manner as in the foregoing embodiments.

In such a configuration having the two signal lines 42a and 42b symmetrically arranged, the distance between the terminal electrode 41a and one pixel electrode 47 becomes smaller as the distance between the other terminal electrode 41b and the pixel electrode 47 grows larger. Thus, the sum of the distances from one pixel electrode 47 to the two terminal electrodes 41a and 41b along respective signal lines 42a and 42b is equal to the sum of the distances from any other pixel electrode 47 to these terminal electrodes 41a and 41b. Accordingly, a difference in wiring resistance, which reflects the difference between the total distance from the two terminal electrodes 41a and 41b to one pixel electrode 47 along the signal electrodes 42a and 42b and the total distance from the two terminal electrodes 41a and 41b to any other pixel electrode 47, is minimized. Further, any one of the pixel electrode 47 is supplied with driving signals from both the terminal electrodes 41a and 41b. Therefore, the liquid crystal display apparatus of this configuration, as a whole, can realize a display with less non-uniformity. Though Japanese Unexamined Patent Publication JP-A 59-83190 (1984) discloses an active-matrix configuration similar to that as shown in FIG. 6, this prior art configuration does not take into consideration the delivery of driving signals from both of two signal lines and hence cannot lessen display non-uniformity.

Figure 7:
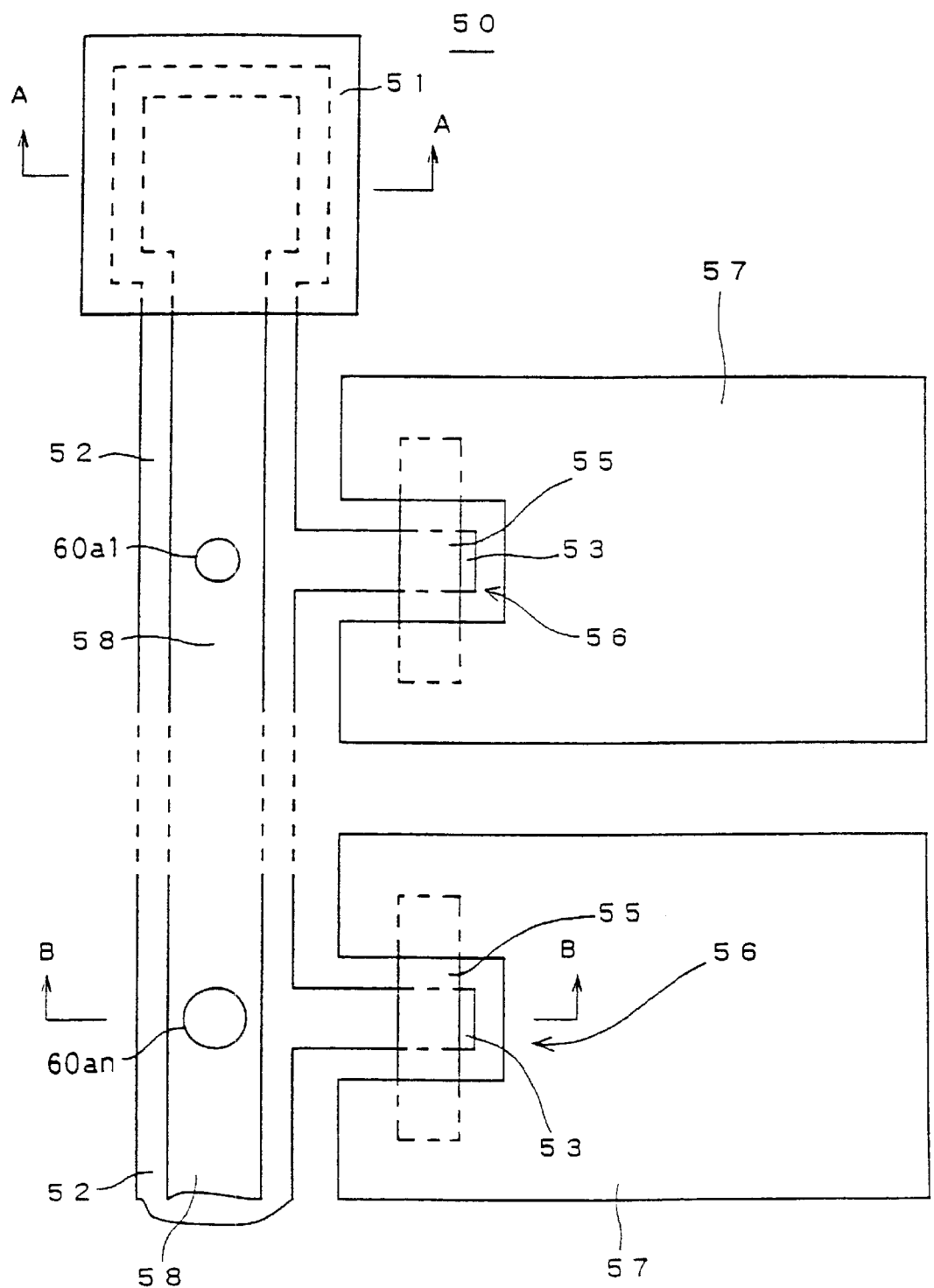
FIG. 7 is a partial plan view of an active-matrix configuration of a liquid crystal display apparatus 50 as a fifth embodiment of the invention.

FIG. 7 is a partial plan view of an active-matrix configuration of a liquid crystal display apparatus 50 as a fifth embodiment of the invention. In the liquid crystal display apparatus 50 according to this embodiment, a signal line 52 is formed to extend toward one side from a terminal electrode 51. Along the signal line 52 are formed a plurality of lower electrodes 53 with a constant interval, each extending in a direction perpendicular to the signal line 52, and the signal line 52 and the lower electrodes 53 are formed thereon with respective insulating films. On the insulating films formed on the lower electrodes 53 are formed upper electrodes 55. Thus, MIM devices 56 are formed. After the MIM devices 56 have been formed, pixel electrodes 57 each comprising a transparent electrode are formed. The fabrication process from the formation of the signal line 52 to the formation of the pixel electrodes 57 is the same as in the foregoing embodiments.

In this embodiment, another signal line 58 is formed on the signal line 52. The signal line 58 is formed at the same time with the upper electrodes 55 from titanium. The two signal lines 52 and 58 are connected to each other via conductive portions 60a1, . . . , 60an each located adjacent a branching portion at which each lower electrode 53 branches from the signal line 52. The conductive portions 60a1, . . . , 60an are formed such that their respective contact area grows larger as the distance from the terminal electrode 61 on one end of the signal lines 52 and 58 to each conductive portion grows larger. This configuration is capable of equalizing the respective wiring resistances of the paths of driving signals from the terminal electrode 61 to respective MIM devices 56 without adjusting the distances from the terminal electrode 61 to respective MIM devices 61, thereby applying driving signals of generally the same waveform to the MIM devices 56. In this way, an improved display with less non-uniformity can be realized.

Figure 8A:
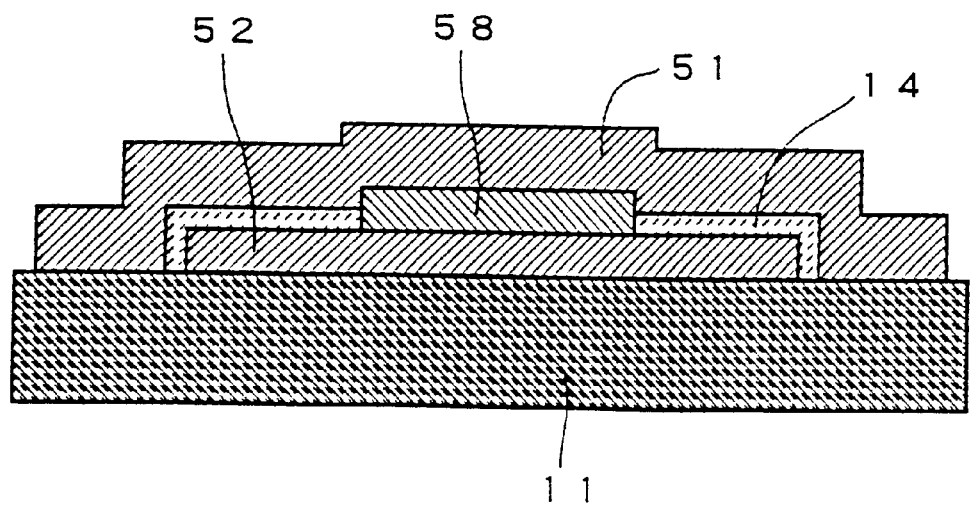
FIGS. 8A and 8B are sectional views of the active matrix configuration of the embodiment of FIG. 7.
Figure 8B:
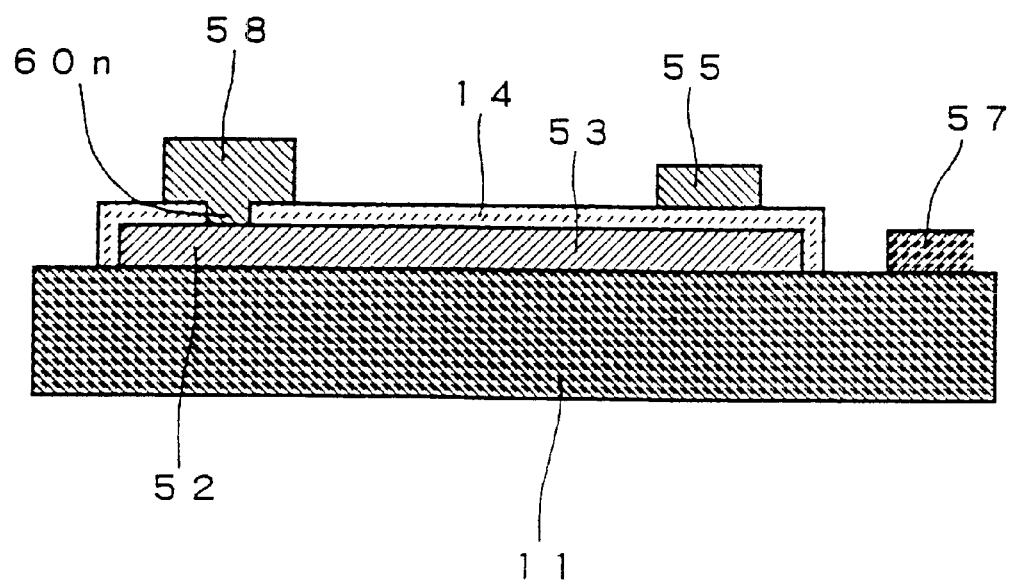
Figure 9:
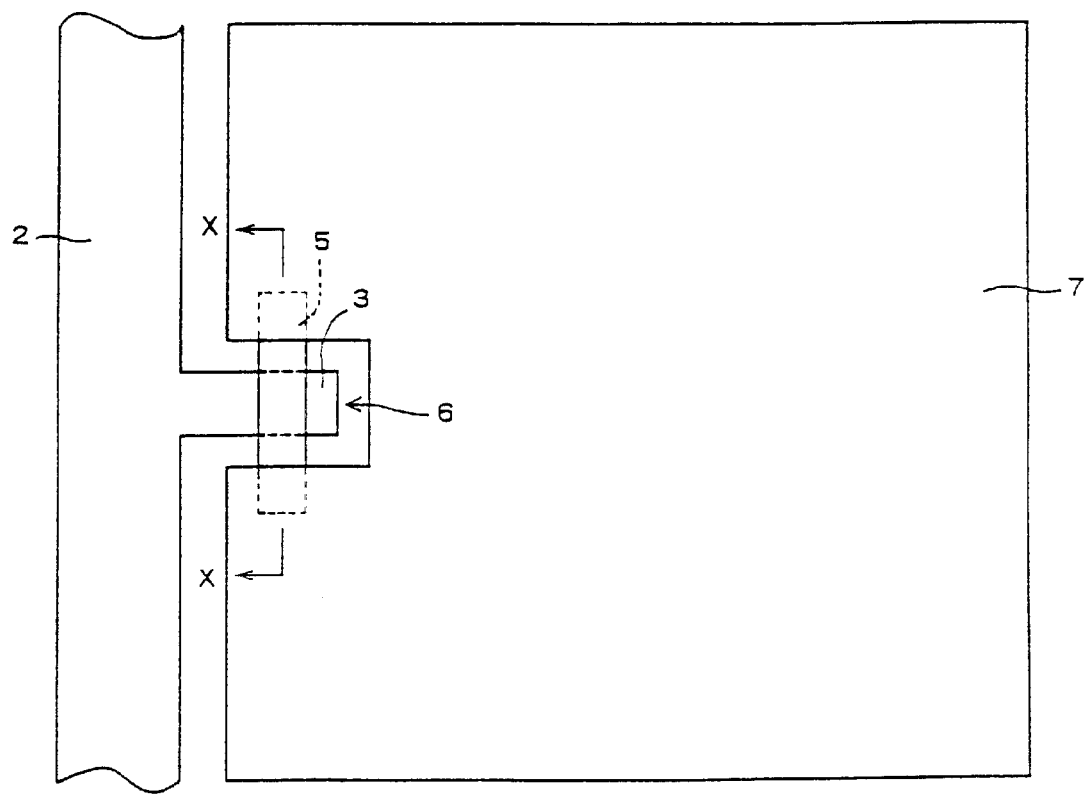
FIG. 9 is a partial plan view showing an active matrix configuration of a prior art MIM drive type liquid crystal display apparatus.
Figure 10:
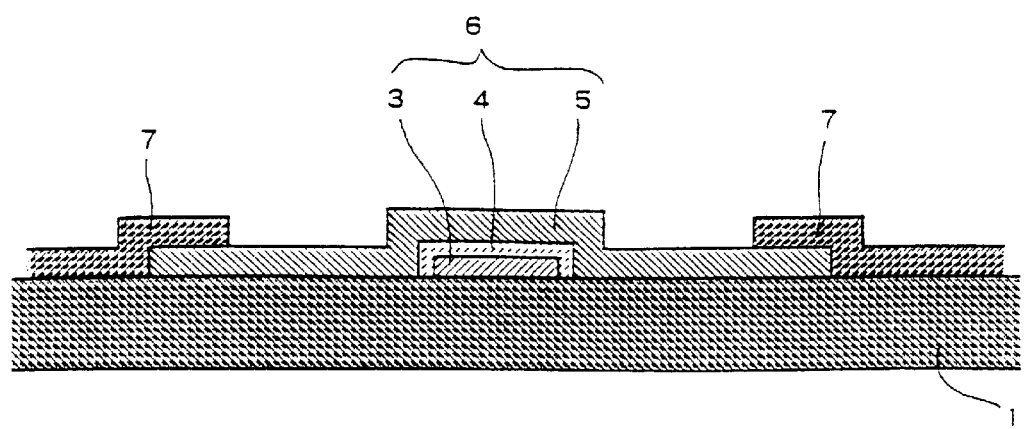
FIG. 10 is a sectional view taken on line X—X in FIG. 9.
Figure 11A:
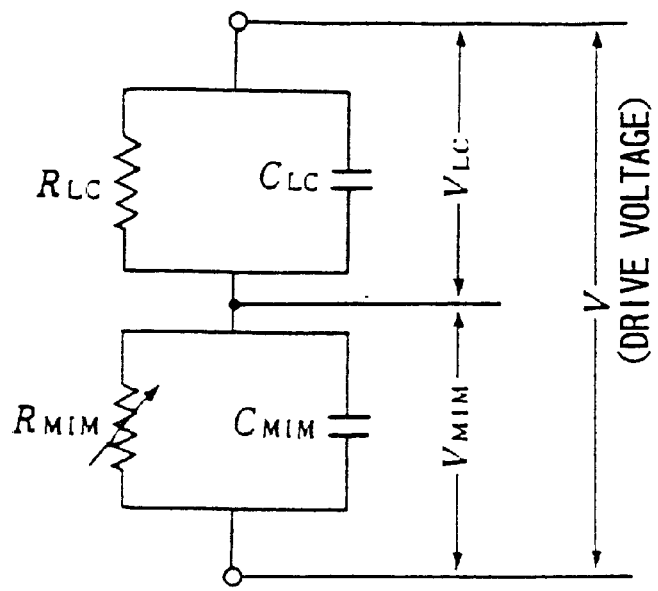
FIGS. 11A and 11B are a partial circuit diagram and graph showing electric characteristics of the active-matrix configuration of the MIM drive type liquid crystal display apparatus of FIG. 9.
Figure 11B:
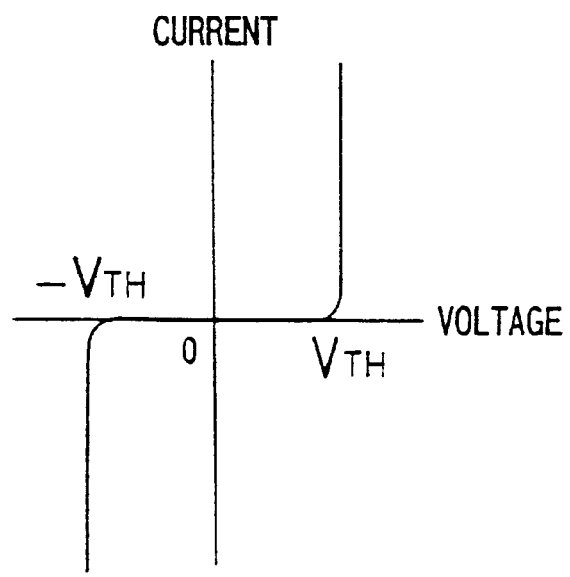

FIGS. 8A and 8B are sectional views taken on lines A—A and B—B, respectively, in FIG. 7. Specifically, FIG. 8A is a sectional view of a portion around the terminal electrode 51 taken on line A—A in FIG. 7, and FIG. 8B is a sectional view of a portion around the MIM device 56n taken on line B—B in FIG. 7. In this embodiment, the signal lines 52 and 58 are stacked on each other to form a double layer, thereby reducing the wiring resistance thereof. The wiring resistance of signal electrodes used in a panel having, for example, a size of 7 inches and a definition of XGA, which is conventionally 20 kΩ or higher, can be reduced to 10 kΩ or lower. Though the difference in wiring resistance reflecting the difference in distance from the terminal electrode 51 in such a panel assumes 20 kΩ, such a difference in wiring resistance can be reduced to 5 kΩ or lower by adjusting the resistance of each of the conductive portions 60a1, . . . , 60an. As a result, the difference in the wiring resistance of the signal lines 52 and 58 reflecting the difference in distance from the terminal electrode 51 and the pixel electrodes 57 are reduced thereby eliminating a non-uniform display problem. Further, since the wiring resistance of the signal lines 52 and 58, as a whole, is lowered, the driving voltage V can be lowered and a signal of less rounded waveform can be ensured, thereby presenting an improved display with less non-uniformity.

It should be noted that the invention is not limited to the foregoing embodiments. For example, the third embodiment and the fifth embodiment are combined together to eliminate a non-uniform display resulting from the influences of the wiring resistance of signal lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:

a pair of substrates;

a liquid crystal layer sandwiched between the pair of substrates;

pixel electrodes arranged in a matrix shape on each of the substrates;

two-terminal nonlinear devices for selectively driving each of the pixel electrodes;

a signal line for delivering a driving signal to each of the pixel electrodes; and a terminal electrode provided at an end of the signal line, wherein the two-terminal nonlinear devices associated with each of the pixel electrodes have a resistance adjusted according to resistances of the signal line extending between the terminal electrode and the respective pixel electrode.

2. A liquid crystal display apparatus comprising:

a pair of substrates;

a liquid crystal layer sandwiched between the pair of substrates;

pixel electrodes arranged in a matrix shape on each of the substrates;

first and second two-terminal nonlinear devices provided for each of the pixel electrodes for selectively driving the pixel electrodes;

a first signal line for delivering a driving signal to each of the pixel electrodes via the first two-terminal nonlinear device;

a second signal line for delivering a driving signal to each of the pixel electrodes via the second two-terminal nonlinear device;

a first terminal electrode provided at an end of the first signal line; and a second terminal electrode provided at an end of the second signal line, wherein the first signal line and the second signal line are formed so that a total value of resistance of the first signal line extending from the first terminal electrode to the first two-terminal nonlinear device and resistance of the second signal line extending from the second terminal electrode to the second two-terminal nonlinear device is almost the same at the respective pixel electrodes, and each of the pixel electrode receives the driving signal from both the first and second signal lines.

3. A liquid crystal display apparatus comprising:

a pair of substrates;

a liquid crystal layer sandwiched between the pair of substrates;

pixel electrodes arranged in a matrix shape on each of the substrates;

two-terminal nonlinear devices for selectively driving the pixel electrodes;

a terminal electrode to which a driving signal is delivered;

a first signal line extending toward one side from the terminal electrode;

an insulating film formed on the first signal line; and a second signal line formed on the insulating film, wherein the first and second signal lines are connected to each other at plural conductive portions, and the plural conductive portions each have a resistance adjusted according to resistances of the first and second signal lines between the terminal electrode and the respective pixel electrodes.

* * * * *